Sept. 5, 1944.　　　　W. O. SCHULTZ　　　　2,357,772
CUT-OUT CONSTRUCTION
Filed Feb. 6, 1943　　　　8 Sheets-Sheet 1

INVENTOR.
WILLIAM O. SCHULTZ
BY
ATTORNEY.

Sept. 5, 1944.   W. O. SCHULTZ   2,357,772
CUT-OUT CONSTRUCTION
Filed Feb. 6, 1943   8 Sheets-Sheet 2
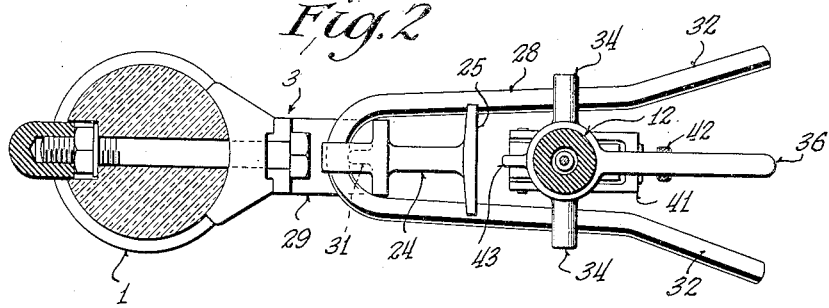
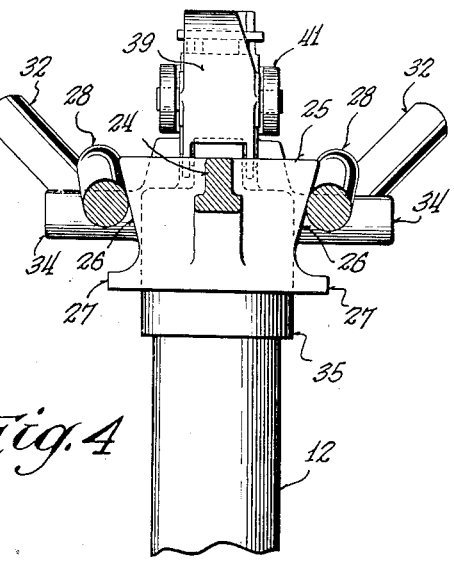
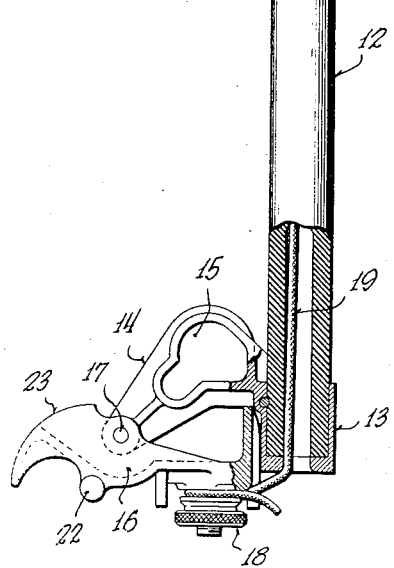
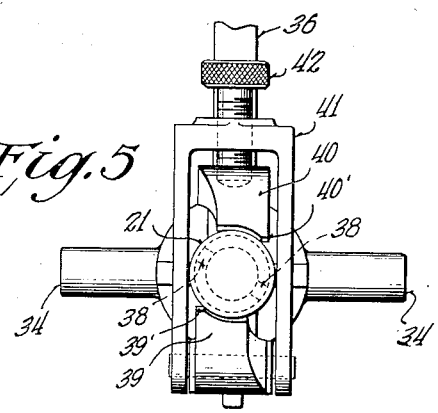
INVENTOR.
WILLIAM O. SCHULTZ
BY
ATTORNEY.

INVENTOR.
WILLIAM O. SCHULTZ
BY
Arthur R. Woolfolk
ATTORNEY.

Sept. 5, 1944.    W. O. SCHULTZ    2,357,772
CUT-OUT CONSTRUCTION
Filed Feb. 6, 1943    8 Sheets-Sheet 4

INVENTOR.
WILLIAM O. SCHULTZ
BY
Austin R. Woolfolk
ATTORNEY.

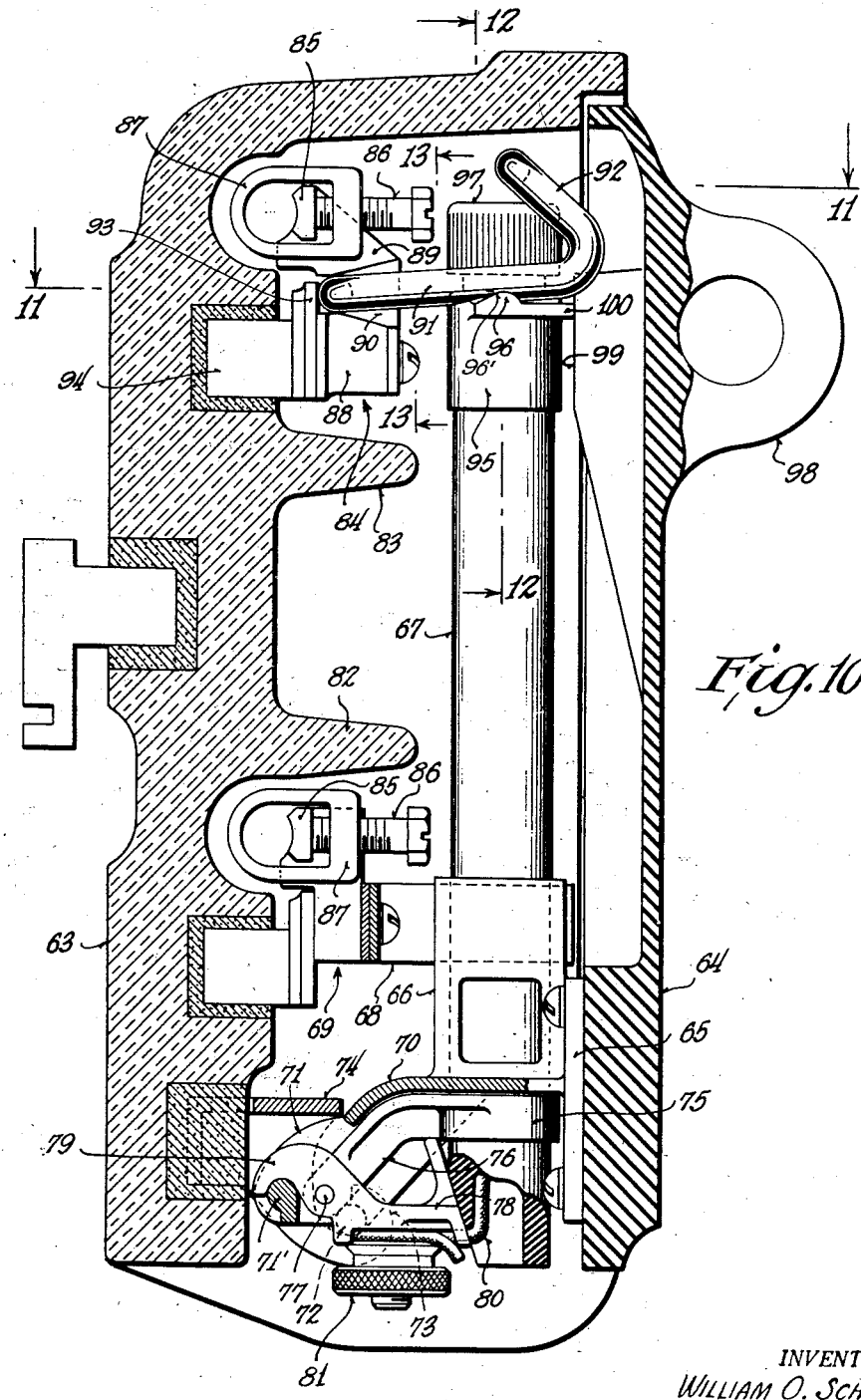

Sept. 5, 1944.  W. O. SCHULTZ  2,357,772
CUT-OUT CONSTRUCTION
Filed Feb. 6, 1943  8 Sheets-Sheet 6
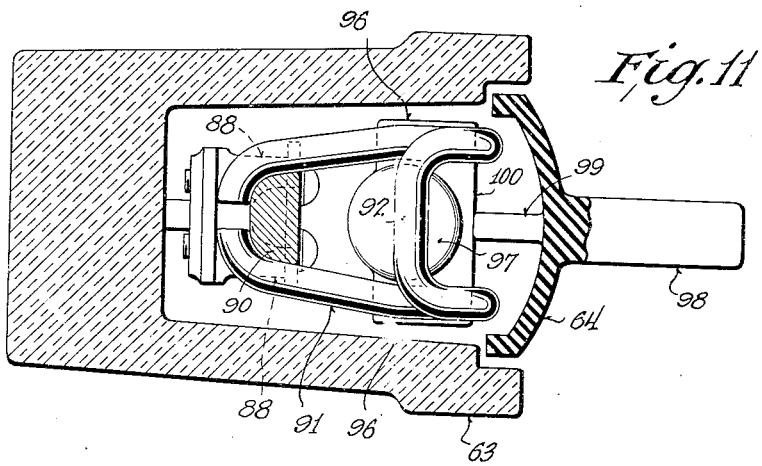
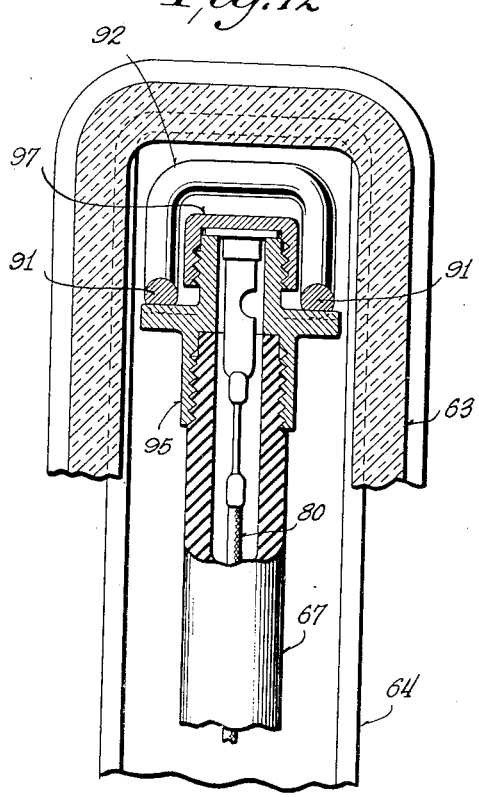
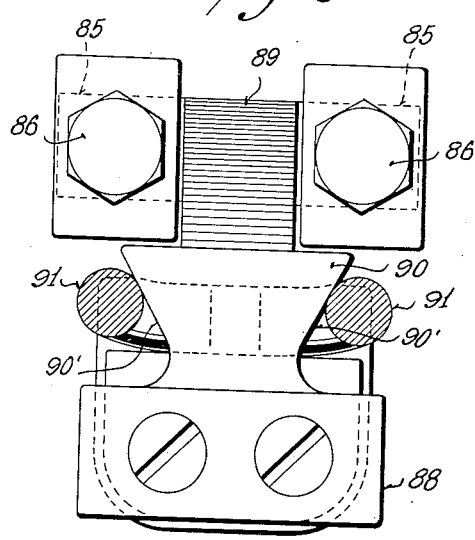
INVENTOR.
WILLIAM O. SCHULTZ
BY
Arthur R. Woolfolk
ATTORNEY.

Sept. 5, 1944. W. O. SCHULTZ 2,357,772
CUT-OUT CONSTRUCTION
Filed Feb. 6, 1943 8 Sheets-Sheet 7
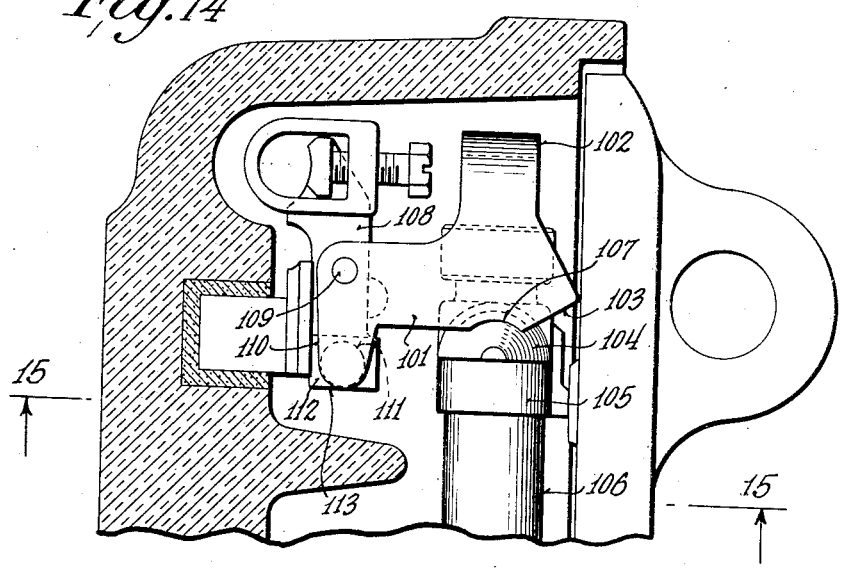
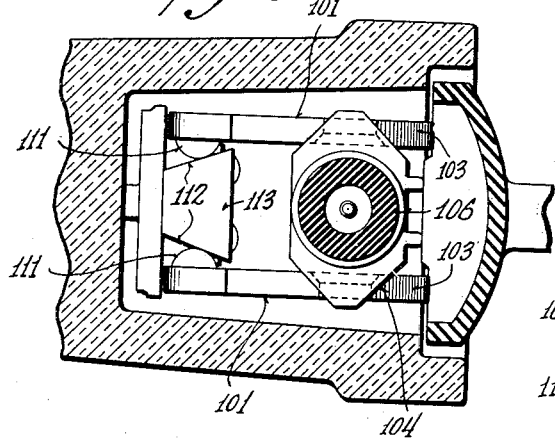
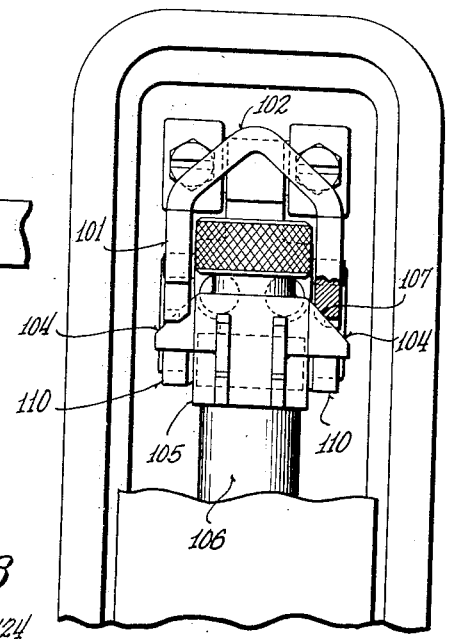
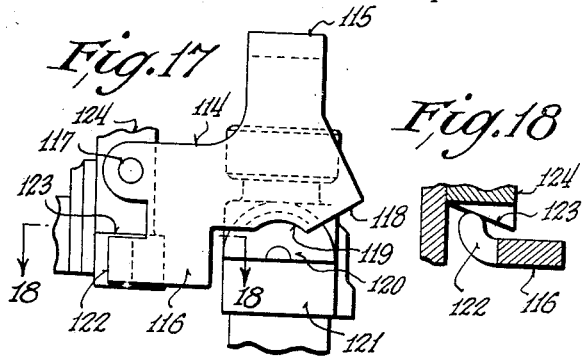
INVENTOR.
WILLIAM O. SCHULTZ
BY
Arthur R. Woolfolk
ATTORNEY.

Sept. 5, 1944.  W. O. SCHULTZ  2,357,772
CUT-OUT CONSTRUCTION
Filed Feb. 6, 1943  8 Sheets-Sheet 8
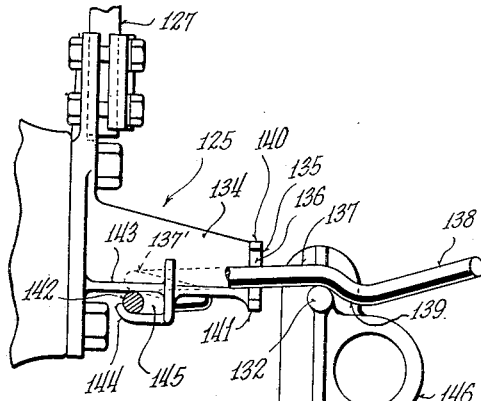
Fig.19
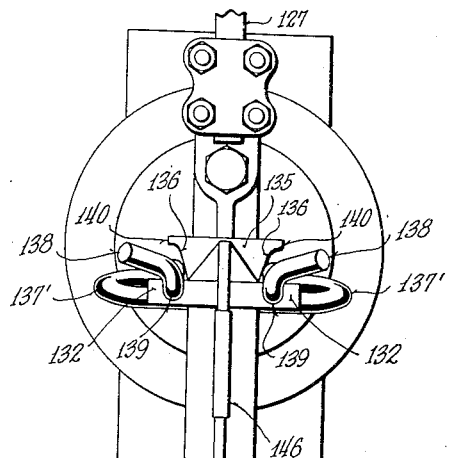
Fig.20
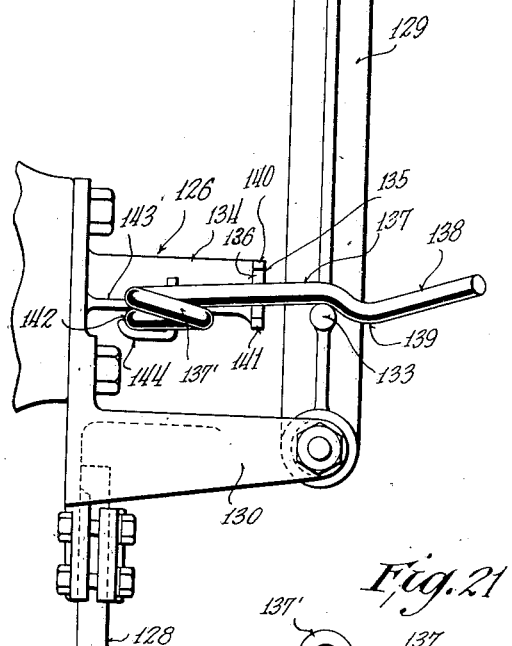
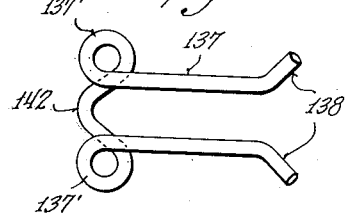
Fig.21
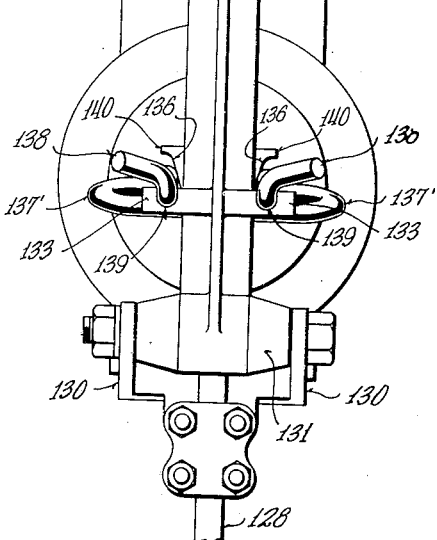
INVENTOR.
WILLIAM O. SCHULTZ
BY
Arthur R. Woolfolk
ATTORNEY.

Patented Sept. 5, 1944

2,357,772

UNITED STATES PATENT OFFICE 2,357,772

CUT-OUT CONSTRUCTION

William O. Schultz, South Milwaukee, Wis., assignor to Line Material Company, South Milwaukee, Wis., a corporation of Delaware Application February 6, 1943, Serial No. 474,939

42 Claims. (Cl. 200—114)

This invention relates to cut-out constructions.

Objects of this invention are to provide a cut-out construction in which a novel contact means is employed which is so made that it secures point contact or at most line contact with a heavy contact pressure both on a stationary terminal and on a terminal of the cut-out to thus secure excellent electrical contact, and which at the same time has the further function of providing current transfer means without the use of flexible jumpers.

Further objects are to provide a contact construction for cut-outs such as fuses either of the drop-out or of the non-drop-out type and for other forms of cut-outs such as switches which is of simple and sturdy construction, which is scraped clean when a cut-out is rocked back into service position, which may be formed in a compact manner so as to be readily adaptable not only for an open type cut-out but for a housed type of cut-out as well, and which does not require the use of auxiliary springs but which in itself provides the necessary resiliency.

In greater detail further objects are to provide a contact construction for cut-outs which is so made that the member which acts both as the contact means and the spring pressure means may be formed as a single unitary member, and which is easily assembled on the stationary portion of the stationary contact without requiring any auxiliary parts whatsoever.

Further objects are to provide a contact construction for cut-outs which is so made that the ratio of lateral pressure on the stationary contact to downward pressure on the bridging member of the cut-out may be made any value desired depending on the design of the cam means and the stiffness of the resilient cooperating contact member.

Further specific objects are to provide a contact construction for cut-outs in which the current transfer and resilient means of the stationary contact is formed generally U-shaped, and to provide cooperating cam means whereby the lateral resiliency of the U-shaped member is utilized not only to provide stationary contact gripping means but also to provide the downward pressure on the upper terminal of the cut-out, such member, therefore, being employed to both grip the stationary portion of the stationary terminal to provide the contact pressure at such place and also to provide the downward pressure on the upper terminal of the cut-out to thereby secure contact pressure at such terminal of the cut-out, and also to provide a heavy contact pressure between the lower contact of the fuse tube and the lower stationary contact when a fuse tube type of cut-out is employed, and in the case of a drop-out fuse construction, to provide the downward bias for the fuse tube in addition to any bias furnished by gravity.

Embodiments of the invention are shown in the accompanying drawings, in which:

Figure 2 is a sectional view on the line 2—2 of Figure 1.

Figure 3 is a view of the fuse tube and associated parts removed from the remainder of the apparatus, such view being partly in section.

Figure 4 is an enlarged sectional view on the line 4—4 of Figure 1.

Figure 5 is a fragmentary top view of the fuse tube.

Figure 10 is a view of a further form of the invention showing a housed type of cut-out in the form of a drop-out fuse tube, such view being in section.

Figure 11 is a sectional view on the line 11—11 of Figure 10.

Figure 12 is a sectional view on the line 12—12 of Figure 10.

Figure 13 is an enlarged fragmentary sectional view on the line 13—13 of Figure 10.

Figure 14 is a sectional view showing the upper portion of a further form of the invention applied to a housed type of cut-out in the form of a drop-out fuse device.

Figure 15 is a sectional view on the line 15—15 of Figure 14.

Figure 16 is a view looking into the front of the upper portion of the device shown in Figure 14 with the upper end of the door broken away.

Figure 17 is a fragmentary detail of a further form of the invention.

Figure 18 is a sectional view on the line 18—18 of Figure 17.

Figure 19 is a view of a further form of the invention showing a cut-out in the form of a switch, such view being a side elevation with parts broken away.

Figure 20 is a front view of the structure shown in Figure 19.

Figure 21 is a plan view of one of the spring connectors of a stationary terminal drawn to a smaller scale.

Figure 1:
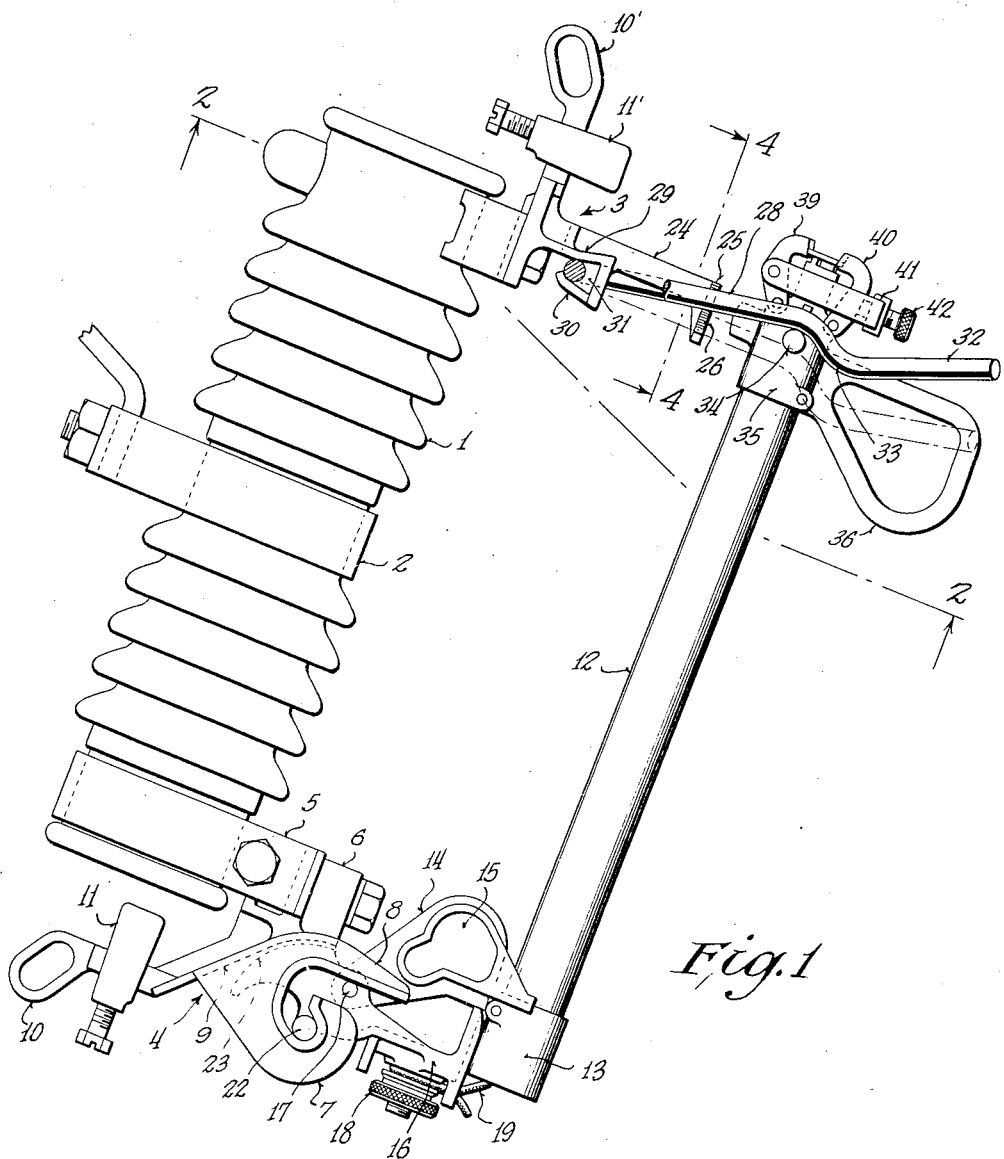
Figure 1 is a side elevation with parts broken away and in section showing one form of the invention, such view showing an open type of cut-out in the form of a drop-out fuse.

Referring to the first form of the invention shown in Figures 1 through 5, it will be seen that the device comprises an elongated insulator 1 supported by a hanger 2 intermediate its ends and provided with upper and lower terminal members indicated generally by the reference characters 3 and 4.

The upper and lower terminal members may be secured to the insulator in any suitable manner. For example, the lower terminal member is secured by means of a strap 5 which encircles the lower portion of the insulator 1 and is held clamped by means of a bolt as indicated. A casting 6 is bolted to the clamp 5, as shown, and this casting is provided with a pair of trunnion supports in the form of hook members 7 which are spaced apart and which are provided with overhanging portions 8 and with a transversely extending web portion 9. The casting 6 extends downwardly and is provided with an eyelet portion 10 to which a conductor may be tied and with a connector or clamping member 11 whereby the conductor may be electrically joined and mechanically clamped to the lower terminal.

The upper terminal 3 is similarly provided with an eyelet portion and a connector portion indicated at 10' and 11' respectively.

A drop-out fuse tube is provided and is indicated by the reference character 12. This drop-out fuse tube is equipped with a sleeve like member 13 at its lower end which fits snugly over the lower end of the fuse tube, as shown in Figure 3, and may be provided with an inwardly extending flange abutting the lower edge of the fuse tube. It is rigidly secured to the lower portion of the fuse tube in any suitable manner. For example, it may be pinned to the fuse tube, as shown in Figure 3. A downwardly and rearwardly extending arm 14 is formed integrally with the sleeve member 13 and is provided with a keyhole-shaped eyelet 15 which may be engaged by a switch stick when lifting the fuse tube out of service after it has dropped to open position or replacing it in the trunnion support in a well known manner.

A fuse link extracting lever 16 is pivotally mounted as indicated at 17 to the arm 14 and is provided with a thumb nut 18 screwed on a threaded pin rigid with the lever 16 to clamp the flexible leader 19 of a fuse link to the lever. The fuse link may be of any desired construction and, as shown in Figure 3, may have a reduced fusible section 20 adjacent its upper portion and may terminate in a button head 21 at its upper end. The lever 16 is approximately channel-shaped at its rear portion, as shown most clearly in Figure 3, and is provided with a pair of outwardly extending trunnions 22 which project outwardly from the side walls of the channel-shaped portion of the lever 16. These trunnions are removably received within the trunnion supports or hooks 7. It is to be noted that the lever 16 is provided with a curved rear portion 23. This curved rear portion is positioned beneath the web 9, see Figure 1, when the fuse tube is in operative position and prevents inadvertent detachment of the trunnions 22 from the trunnion supports or hooks 7. Particularly, this extension 23 will engage the web 9 upon upward recoil of the fuse tube and thereby resist the upward recoil. In addition to these features, it is to be noted that the trunnions 22 cannot be detached from the trunnion supports 7 until the fuse tube has rocked downwardly to inoperative position. Thereafter, as stated, the fuse tube may be lifted from the trunnion supports by means of a switch stick in the usual manner.

The upper terminal 3 is secured to the upper end of the insulator 1 by means of a bolt, as shown most clearly in Figure 2, a nut being positioned in a recess in the insulator 1 and an insulating cap covering the outer end of the bolt so as to prevent birds sitting on the hanger 2 from reaching any live portion of the upper terminal member.

The upper terminal 3 is provided with an outwardly extending arm 24 which is provided with a transverse web portion 25 at its outer end. This transverse web portion is provided with upwardly and outwardly divergent cam faces or trackways 26 and with stops 27 at the lower ends of the transverse web 25. This is most clearly shown in Figure 4.

A relatively heavy spring like contact member which may be in the form of a general U-shape is indicated by the reference character 28, see Figures 1 and 2. The rear or curved portion of the heavy spring contact member 28 is loosely pivotally carried by the upper terminal 3, as shown in Figures 1 and 2. It may be mounted beneath a transverse webbed portion 29 of the arm 24 and above a lip 30 formed integrally with the arm. After the spring contact member 28 has been so positioned, the lip 30 has its inner end bent inwardly, such lip and the associated portions of the arm 24 being formed of malleable, highly conducting material. Thus the spring contact 28 is loosely pivotally mounted and is held against displacement.

It is to be noted from reference particularly to Figures 1 and 2 that a small, inwardly extending web 31 is provided which projects inwardly and engages the front side of the curved portion of the spring contact arms 28. If desired, this web like member 31 may have a rounded recessed portion to conform to the rounded cross-section of the spring contact arm 28.

It is to be noted from reference to Figures 1, 2 and 4 that the heavy spring contact arms 28 forming a portion of the upper stationary terminal are provided with divergent end portions 32 which flare outwardly and upwardly and act as guides in guiding the fuse tube into position when the fuse tube is rocked into closed position.

It is to be noted also from Figure 1 that the spring contact member 28 is provided with downwardly depressed locking portions 33 at an intermediate point. The purpose of this is to provide portions behind which the pins or other projections 34 of the upper terminal of the fuse tube may be positioned when the fuse tube is in its service or operative position. It will be seen that the spring member 28 constitutes a connecting member for electrically connecting the upper terminal of the fuse tube with the upper stationary terminal.

The upper terminal of the fuse tube may comprise a sleeve like member 35 which is rigidly secured, as by pinning or other means, to the fuse tube, as shown in Figure 3. Preferably a manipulating eyelet 36 is formed integrally with the upper terminal member 35. The upper terminal member 35 extends upwardly in the form of a tubular portion of reduced external diameter as indicated at 37 in Figure 3, and this tubular portion is provided with a pair of projecting lugs 38 at diametrically spaced points as indicated in Figure 5. The button head 21 of the fuse link rests upon these lugs.

A pair of clamping arms indicated by the reference characters 39 and 40 are pivotally mounted on and form a portion of the upper contact of the fuse tube. These arms have curved and beveled inner faces which engage diametrically opposite portions of the button head 21 when such members are held in clamped engagement with the button head. A clamping action of the jaws or clamping members 39 and 40 may be obtained by means of a U-shaped link 41 pivoted to the member 39 and through which a screw 42 is threaded. The screw 42 has a manipulating knurled outer head and a rounded inner end which fits within a socket formed in the clamping member 40, as shown in Figure 3, so that when the screw is tightened, the clamping members 39 and 40 securely engage the button head 21 of the fuse tube and form an excellent electrical contact therewith. It is to be noted that the clamping members 39 and 40, as shown in Figure 5, have their curved beveled faces arranged on opposite sides of the head 21 of the fuse link as hereinbefore stated and that they are so formed that they engage the button head 21 in a manner to center the button head over the upper end of the fuse tube to thereby cause such button head to at least partially close the upper end of the fuse tube. It is to be noted that these clamping members 39 and 40 are cut away on opposite sides and terminate in lips 39' and 40' so that the clamping members have a material area of engagement with the button head and yet so that the innermost extensions 39' and 40' of such clamping members are spaced a considerable distance from the lugs 38, such lugs being set on a slanting diameter, as shown in Figure 5. The purpose of this is to provide a construction so that button heads of different sizes for different size fuse links may be employed. For example, when a smaller button head than that shown in Figure 5 is employed, it is obvious that the clamping members 39 and 40 will move inwardly to a greater distance than for the larger button head. However, the most inwardly projecting portions 39' and 40' of the clamping members 39 and 40 will not be interfered with by the projections 38.

It is to be appreciated that in the normal operation of the device there is some wearing away or erosion of the inner rounded faces of the clamping members 39 and 40 and consequently it is desirable to have the points 39' and 40' as far away from the posts 38 as possible to allow for this gradual inward approach of the points towards the posts as wear occurs.

In the operation of this apparatus it will be seen that when the fuse link blows under overload conditions, the lever 16, see Figure 1, will be released and the lower end of the fuse tube will move downwardly and outwardly, thus allowing the projections or pins 34 of the upper contact of the fuse tube to disengage themselves from the arms of the upper spring contact 28 and the fuse tube will thereafter rock downwardly to inoperative position. Gravity assists in this action but the principle downward force acting on the fuse tube is obtained by the heavy downward pressure exerted by the spring contact member 28 and inasmuch as the pivot 17 is located forwardly of the trunnions 22, the fuse tube will be biased towards drop-out motion.

If a light overload occurs, the usual expulsion action takes place. However, under heavy overload conditions the tube can vent itself at both ends as the button head 21 will be blown away from the clamping members 39 and 40 and the upper end of the fuse tube will be open as well as the lower end. It is to be noted that the outwardly beveled, curved faces of the jaws 39 and 40 facilitate the outward blowing of the button head 21 of the fuse link.

When the fuse tube drops outwardly, it swings downwardly and hangs downwardly from the trunnions 22.

When the device is to be refused, the lineman lifts the fuse tube from the lower trunnion supports by means of a switch stick engaging within the eyelet 15 and a new fuse is inserted in the fuse tube and secured as shown in Figure 3. Thereafter the fuse tube is replaced in the lower trunnion supports 7 by means of a switch stick. The lineman then disengages the switch stick and engages it in the eyelet 36 and rocks the fuse tube upwardly into operative position, as shown in Figure 1.

The spring arms 28 are so formed that they tend to move inwardly and they ride downwardly along the inclined cam faces 26, see Figure 4, and rest upon the stops 27 until the fuse tube is rocked into operative position. When the fuse tube is rocked into operative position, the pins or projections 34 ride beneath the arms of the heavy spring contact 28 and force such arms upwardly. In addition to this, the arms of the heavy spring contact 28 are spread apart by means of the upwardly divergent cam faces 26, see Figure 4, and a most excellent electrical contact is obtained between these arms and the faces 26, in addition to the excellent electrical contact between the pins or projections 34 and such arms. Thus an excellent electrical connection is obtained from the upper terminal 35 of the fuse tube and the upper stationary terminal 3 without the use of flexible leaders or other similar means. When the fuse tube is rocked to its final operative position, as shown in Figure 1, it is to be noted that the projections or pins 34 are located behind the downwardly depressed portions 33 of the spring arms 28 and thus latch the fuse tube in place.

It is to be noted particularly that the heavy spring arms 28 have a point contact or at most a line contact with the cam faces 26 and with the pins or projections 34 and that they exert heavy contact pressure at these points and thus afford an excellent electrical contact, in addition to serving directly as the current transfer means between the upper contact of the fuse tube and the upper stationary contact, thus eliminating the need for flexible jumpers.

It is to be noted that the transverse member 25 acts as a stop to limit the inward rocking motion of the fuse tube, a lug 43 being formed integrally with the upper contact 35 of the fuse tube and cooperating with the member 25 to limit inward rocking motion.

Figure 6:
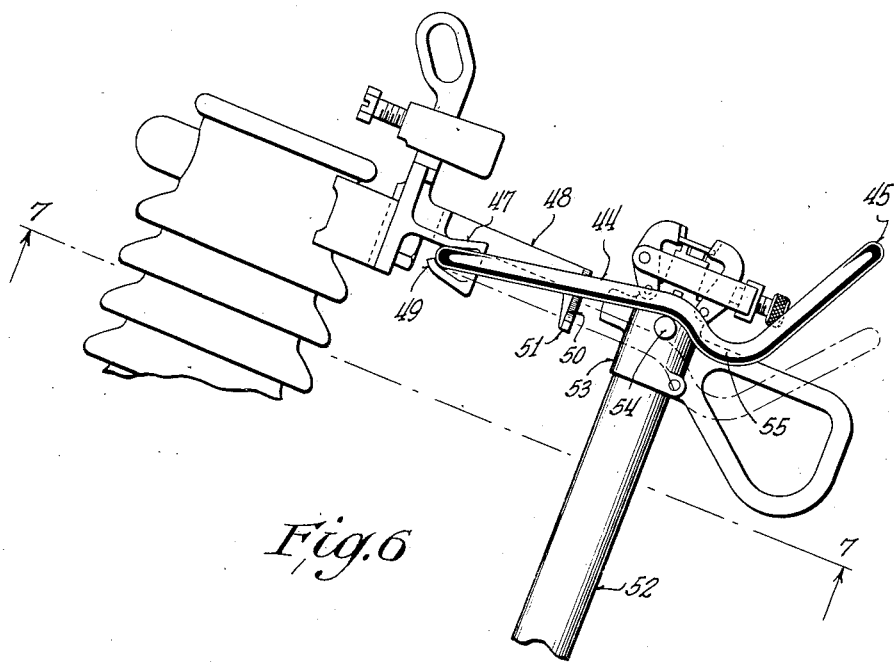
Figure 6 is a view of the upper portion of a further form of the invention.
Figure 7:
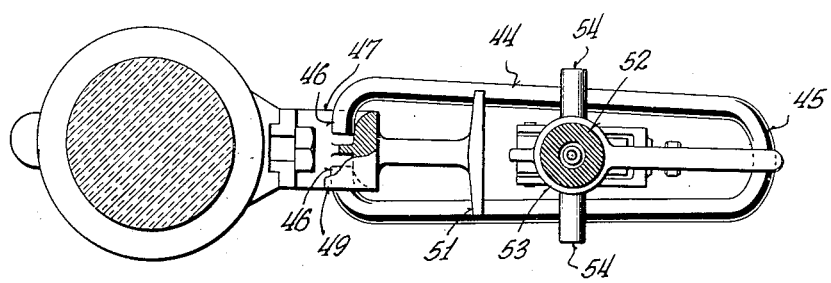
Figure 7 is a sectional view on the line 7—7 of Figure 6 with parts broken away.

The invention may take other forms. For example as shown in Figures 6 and 7, the upper contact may include the spring contact member 44 which has a closed loop 45 at its outer end and inwardly turned pivot portions 46 at its inner end. The portions 46 are received beneath the flange 47 of the member 48 and a lip 49 is bent inwardly below such inwardly turned portions after assembly to thus hold such portions loosely in place while allowing pivotal motion of the heavy spring contact member 44. The member 48 is provided with cam faces 50 and with stops 51 at their lower end as previously described. The fuse tube 52 has its upper contact 53 provided with pins 54 projecting from opposite sides thereof. It is to be noted that the outer portion of the spring contact member 44 is upwardly turned so that the pins 54 may ride beneath such arms during the closing motion of the fuse tube, the lowest position of the member 44 being indicated in dotted lines. The pins 54 ride beneath the downward depressed portions 55 of the heavy spring contact member 44. It will be seen that the spring member 44 constitutes a connecting member for electrically connecting the upper terminal of the fuse tube with the upper stationary terminal. The spreading of the arms constituting the member 44 occurs as they ride upwardly on the cam faces 50 when the fuse tube is closed and the inner portions 46 of the arms separate during such closing motion, as indicated in Figure 7.

Figure 8:
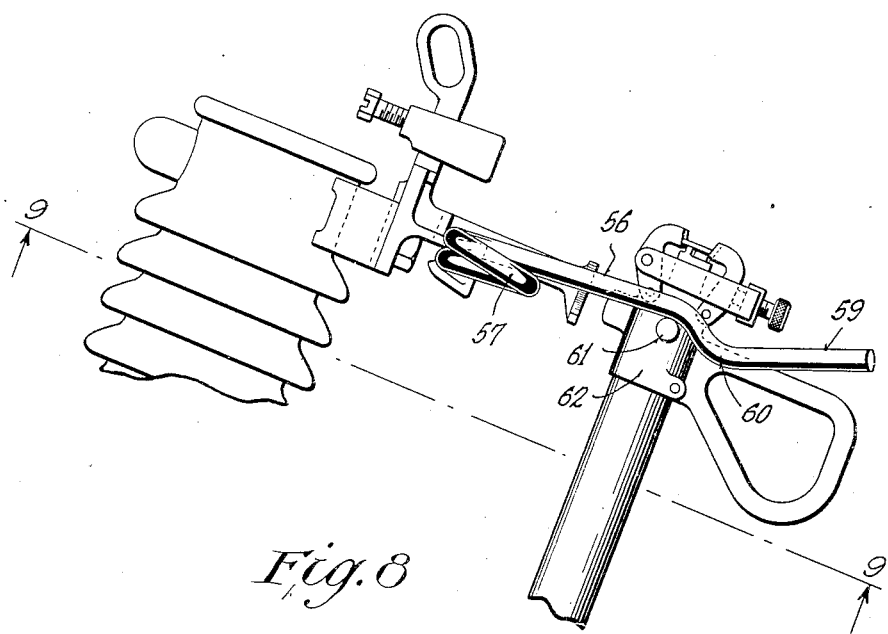
Figure 8 is a view of the upper portion of a further form of the invention.
Figure 9:
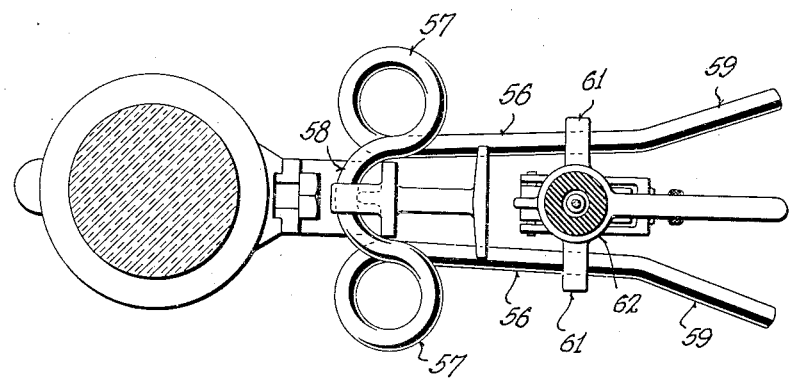
Figure 9 is a sectional view on the line 9—9 of Figure 8.

The form of the invention shown in Figures 8 and 9 follows very closely that shown in Figure 1 except that the spring arms 56 are provided with outwardly projecting convolutions or curled portions 57 intermediate the ends of the arms and the rounded inner loop 58 thereof. This construction provides additional resiliency for the spring arms 56.

The arms 56 are provided with upwardly and outwardly diverging end portions 59 and with the downwardly depressed portions 60 behind which the pins 61 of the upper contact 62 are adapted to be positioned. It will be seen that the spring member 56 constitutes a connecting member for electrically connecting the upper terminal of the fuse tube with the upper stationary terminal.

In the forms of the invention heretofore described it is to be noted that an open type of cut-out in the form of a drop-out fuse is provided but the invention is equally applicable to a closed or housed type cut-out.

In the form of the invention shown in Figures 10 to 13 a housed type of cut-out in the form of a drop-out fuse has been illustrated. This device comprises a housing 63 provided with a door 64. The door 64 is secured to plate like feet portions 65 formed integrally with the lower contact 66 of the fuse tube. This lower contact is in the form of a sleeve through which the fuse tube 67 is adapted to slide. When the device is in closed position, the sleeve 66 is positioned between the spring fingers 68 of the lower terminal indicated generally at 69 and such spring fingers frictionally grip the sleeve 66 and hold the door closed after the fuse tube has slid downwardly to its lowermost position when released upon rupture of the fuse link as will hereinafter appear.

The sleeve 66 is provided with a rearwardly extending curved apron like web or barrier 70 and with a pair of integral, spaced flanges 71 connected by a transversely extending bar like member 71' having a rounded upper face. The flanges 71 are provided with outwardly projecting trunnions 72 on opposite sides thereof which are removably received within hook like members 73 rigidly mounted in the lower portion of the housing, as shown in Figure 10. The flanges 71 have rounded upper portions which are positioned beneath the outwardly projecting transverse web 74 integral with the hook like portions 73.

The fuse tube is provided with a rigidly mounted collar 75 which is equipped with an inwardly and downwardly extending arm 76 provided with a pivot pin 77. A lever 78 is pivotally mounted on the pin 77 and has a hook like portion 79 which is removably hooked over the transverse bar or member 71'. The lever 78 is normally retained in place by the flexible leader 80 of the fuse link, such leader passing through a notched portion in the lower part of the lever and being clamped by means of a thumb nut 81. Preferably the lower inner portion of the fuse tube and the outer face of the lever 78 are beveled, as shown in Figure 10.

The fuse link is provided with a reduced fusible section in accordance with the usual practice and when the fuse link is ruptured on overload, the lever 78 is released and rocks downwardly thus allowing the fuse tube to slide downwardly, such fuse tube being downwardly biased as hereinafter described. Continued rotation of the lever 78 when released upon rupture of the fuse link causes its hook like spaced portions 79 to disengage the bar or transverse member 71' and thus allows the fuse tube to move downwardly with the collar 75, arm 76 and lever 78 clear of all conducting portions, the fuse tube projecting outwardly from the lower end of the housing and the door remaining closed.

It is to be noted that the housing is provided with a pair of spaced barriers 82 and 83 between the upper stationary terminal indicated generally at 84 and the lower stationary terminal indicated generally at 69. Each of these terminals is provided with a pair of transversely extending projecting members 85 located on each side thereof. Each member 85 is rounded on its inner end to bear against a conductor, not shown. A screw 86 is threaded through a clamping member 87 so that the conductor may be clamped between the loop of the clamping member 87 and the rounded face of the transverse member 85. The conductors extend outwardly through the housing through the openings in the housing, the conductors and openings being omitted for the sake of clearness.

The upper stationary terminal 84 includes the lower portion 88 which projects laterally on opposite sides thereof and the upper portion 89. Between these portions an intermediate portion 90 is formed. This portion 90 is provided with the upwardly and outwardly extending cam faces 90' on opposite sides thereof, as shown most clearly in Figure 13, and is provided with a rounded rear portion, as shown in Figure 11.

The upper terminal 84 includes a heavy spring member 91 in the form of a closed U with the closed portion of the U turned backwardly as indicated at 92 in Figures 10 and 11. The portion 90 slants upwardly and outwardly on opposite sides thereof, as may be seen from Figure 13, thereby providing upwardly slanting cam faces as previously described. The arms of the heavy spring member 91 tend to approach each other and thus tend to ride downwardly on the member 90 pivoting about their inner ends, the inner ends being prevented from shifting backwardly by the upwardly projecting flange like portion 93 of the upper terminal member. It is to be noted from reference to Figure 10 that the member 93 forms a unitary portion with a portion 94 cemented or otherwise secured in the housing 63. The member 93 may be integral with the portion 94 or may be a separate member from the portion 94. The lower portion of the upper terminal member is secured by means of screws, as indicated, to the member 94.

The fuse tube 67 is provided with an upper contact 95 which has a pair of outwardly projecting portions 96 rounded on their upper sides and normally positioned beneath the arms of the heavy upper contact spring 91. It will be seen that the spring member 91 constitutes a connecting member for electrically connecting the upper terminal of the fuse tube with the upper stationary terminal.

The cam action of the portion 90 on the spring arms of the contact 91 causes these spring arms to bear downwardly firmly against the projections 96 of the upper contact of the fuse tube and also secure high contact pressure with the portion 90 of the upper stationary terminal. The member 91 serves to urge the fuse tube downwardly in addition to affording current transfer means between the upper terminal of the fuse tube and the upper stationary terminal.

It is to be noted that the upper heavy spring member 91 does not occupy much space in the housing of the device and also that it furnishes the excellent contact pressure both for the upper stationary terminal and for the upper terminal of the fuse tube and avoids the need of flexible jumpers. The fuse tube is biased downwardly towards sliding motion by gravity but the major downward biasing force is caused by the heavy spring contact member 91.

The fuse tube is provided with a screw threaded fuse cap 97 to clamp the button head of the fuse link in place in accordance with the usual practice.

It is to be noted from reference to Figures 10 and 11 that the door 64 is provided with a manipulating eyelet portion 98 and with an inwardly projecting rib 99 which bears against a flange like portion 100 formed integrally with the laterally projecting portions 96 of the upper terminal of the fuse tube. It is to be noted from Figure 10 that there are small notches 96' provided in the spring members 91 which cooperate with the projections 96 to thus constitute latch members.

In the form of the invention shown in Figures 14, 15 and 16 the upper contact spring is formed of heavy sheet metal stamping. It is indicated by the reference character 101 and comprises a pair of main arms which are joined by an upwardly looped portion 102. The lower outer faces of these spring arms are beveled upwardly to provide surfaces 103 beneath which the conical projections 104, which extend outwardly on opposite sides of the upper contact 105 of the fuse tube 106, are adapted to ride. These spring arms are provided with rounded lower recessed portions 107 within which the upper conical projecting portions 104 are adapted to seat when the fuse tube is rocked to closed position as shown. The rounded lower recessed portions 107 are concavely conical to fit the conical members 104. It will be seen that the spring member 101 constitutes a connecting member for electrically connecting the upper terminal of the fuse tube with the upper stationary terminal. This construction is very compact and in addition to this allows the fuse to move slightly from side to side so as to insure firm electrical contact with both projecting portions 104 of the upper contact of the fuse tube.

The arms 101 are pivoted to the stationary portion 108 of the upper terminal of which they form a part as indicated at 109 and are provided with bell crank, downwardly extending arms 110. The arms 110 are provided with inwardly projecting, rounded, button like members 111, as shown most clearly in Figure 15. These members bear against outwardly extending cam surfaces 112 of a stationary cam member 113 and thus urge the spring contact member 101 downwardly. This member 101 is made relatively heavy so that it exerts a very strong spring action and secures a high contact pressure not only with the projections 104 of the upper terminal of the fuse tube but also with the member 113 which is secured rigidly to the stationary portion 108 of the upper terminal. The heavy spring contact member 101, therefore, not only biases the fuse tube downwardly and furnishes a heavy contact pressure but also avoids the need of flexible jumpers as it serves as a current transfer means between the upper stationary terminal and the upper fuse tube terminal.

In the form of the invention shown in Figures 17 and 18 a heavy spring stamping is employed which is also provded with a pair of arm portions 114 joined by an upwardly extending arched portion 115 and provided with a pair of downwardly extending bell crank portions 116, the heavy spring contact member being pivoted as indicated at 117 to a stationary portion of the upper terminal and being provided with the outer cam faces 118 and with the conical, upwardly concave portions 119 adapted to engage the conical projecting portions 120 extending from opposite sides of the upper terminal 121 of the fuse tube. The portions 119 are concavely conical to fit the conical portions 120. It will be seen that the spring member 114 constitutes a connecting member for electrically connecting the upper terminal of the fuse tube with the upper stationary terminal. The arms 116 have inwardly projecting and inwardly curved portions 122 provided with rounded inner ends, as shown most clearly in Figure 18. These rounded inner ends bear against the outwardly flaring cam surfaces 123 formed integrally with the stationary portion 124 of the upper terminal.

In both forms of the invention shown in Figures 14 through 16 and 17 and 18 the spring stamping furnishes the heavy contact pressure and coacts with the cam members to urge the spring contact member downwardly, thereby biasing the tube downwardly and also securing the heavy contact pressure not only with the terminal of the fuse tube but with the stationary portion of the upper stationary terminal, thus avoiding the need of flexible jumpers.

It will be noted further that the conical members 104 and 120, see Figures 14 to 17, not only cooperate with their corresponding portions of the stationary contacts to assist in centering the tube and to secure equal and positive contact on both oppositely projecting members 104 and 120, but also obtain a wiping action due to the slight shift of the tube during centering and also due to the slight spread of the corresponding portions of the stationary contacts.

The clamping means for clamping the conductors to the stationary terminals of the forms of the invention shown in Figures 14 to 16 and 17 and 18 are similar to those described in connection with the form of the invention shown in Figure 10, the openings in the housing through which the conductors extend and the conductors having been omitted in Figures 14 to 16 for the sake of clearness.

In the forms of the invention shown in Figures 14 to 16 and 17 and 18 a sliding drop-out tube construction is employed similar to that shown in Figure 10.

All forms of the invention thus far illustrated are drop-out fuses, but while the invention has been described in connection with drop-out fuses, it is to be distinctly understood that the upper contact construction can be employed with either a drop-out fuse or with a non-drop-out fuse as desired.

It is to be noted that in all forms so far described the heavy downward pressure from the upper contact is transmitted downwardly to the pivot point of the fuse extracting levers of the contact construction and thus a heavy contact pressure is secured at the lower contact to insure a good electrical contact at such point.

It is to be noted, however, that the fuse link though tensioned by the downward thrust on the fuse tube is not unduly strained for the leverage arrangements employed in the lower contact construction are such that only a small fraction of the total downward thrust on the fuse tube is transmitted to the fuse link. In fact the spring members of the stationary contacts may be as heavy or as light as desired and the angularity of the cooperating cam portions may be designed to give any desired ratio between the downward pressure on the bridging member and the lateral pressure between the resilient members and their corresponding cam portions. For example, if a relatively heavy resilient member is employed, the slant on the cam may be made relatively small and an appreciable longitudinal movement of the resilient members may occur when only a very small flexing of the resilient members is required. In other words, the design of the cam in relation to the stiffness of the resilient members will determine the amount of lateral pressure and the amount of downward pressure.

In Figure 1 a pivoted type of drop-out fuse construction has been shown and in Figure 10 a sliding type of drop-out fuse construction has been shown. It is intended by these different showings to indicate that the invention is not limited to any particular form of drop-out fuse construction except as defined in the claims.

In the form of the invention shown in Figures 19 through 21, a different type of cut-out in the form of a switch has been illustrated. In this form of the invention the stationary terminals may comprise the upper and lower stationary terminal member indicated generally at 125 and 126. These stationary terminal members may be connected by suitable clamping means with the conductors 127 and 128. The switch blade is indicated by the reference character 129 and may be pivoted between a pair of arms 130, which arms may be either integral with the lower contact as shown or may be electrically separate therefrom. Obviously if the pivot support for the switch blade is electrically separate from the lower contact 126, the lower conductor 128 would be directly connected to such lower contact 126.

It is preferable to provide the lower portion of the switch blade 129 with a rather extended hub like portion 131 to guard against lateral looseness of the switch blade. Obviously other constructions could be employed. Another feature of the switch blade which may be followed to increase the rigidity thereof is to make the switch blade with flanges extending at right angles to each other throughout the major length of the switch blade, as shown in both Figures 19 and 20. The upper and lower portions of the switch blade are provided with upper and lower projections or ears 132 and 133 which may be in the form of pins or which may have other shapes. These projections extend from opposite sides of the switch blade, as shown most clearly in Figure 20.

The upper and lower stationary contacts are each provided with an outwardly projecting arm portion 134 which terminates in a transversely extending web portion 135. This web portion is provided with the upwardly and outwardly extending cam faces 136. The upper and lower stationary contacts each include a heavy generally U-shaped spring connector 137 which opens outwardly and has upwardly and outwardly diverging arms 138 and which also has downwardly depressed portions 139 behind which the projections 132 and 133 are normally positioned. These heavy spring contact members 137 grip the cam surfaces 136 and are forced apart when the switch is closed, as these members are forced upwardly along the cam faces 136, the cam faces, it being noted, terminating preferably in upper and lower stops 140 and 141.

The resilient U-shaped arms 137 are each provided with a looped rear portion 142 which is positioned beneath the lower web portions 143 of the upper and lower stationary contacts and above an inwardly projecting finger 144. The finger 144 is later bent upwardly to loosely hold the upper and lower spring arms 137 in pivotal engagement with the upper and lower stationary contacts, such upper and lower stationary contacts being formed of malleable material so that the lips 144 may be readily bent inwardly after assembly.

If desired each of the upper and lower contacts may be provided with a small, integrally formed web 145 which extends inwardly and which is provided with a rounded inner end to loosely receive the looped portions 142 of the spring contact members 137. This is shown in the broken away portion at the upper stationary contact in Figure 19. The upper and lower spring contact arms could be made as shown in Figure 2 for instance, but it is preferable to form them with intermediate looped portions 137', as shown most clearly in Figure 21, to thereby increase their resiliency.

When the switch is in open position, the heavy spring like contact members 137 ride downwardly on the cam faces or trackways 136 and grip the lower portion of the trackways between them and rest upon the lower stops 141. When the switch is rocked to closed position, the projections 132 and 133 ride beneath the upwardly and outwardly slanting arms 138 and cause the heavy spring contact members to ride upwardly on the trackways or cam faces 136. These spring arms are spread apart and tightly bear upon and grip the trackways between them. The cam action also exerts a downward thrust which is manifested by a high pressure between the arms 137 and the projections 132 and 133, thus securing excellent electrical connection both with the switch blade itself and with the upper and lower stationary contacts.

If desired, the switch blade may be provided with a manipulating eyelet portion 146 which can be engaged by a switch stick when it is desired to open or close the switch. Obviously other manipulating members could be employed if desired.

The switch as illustrated in Figures 19 and 20 has a heavy, generally U-shaped, spring like connecting member for both its upper and lower stationary terminals. It is obvious that if desired the lower stationary terminal could be omitted and the electrical connection for the lower end of the switch could be furnished through the hinge connection.

From these last described forms of cut-out it is apparent that the bridging member for electrically bridging the stationary terminals need not necessarily be a fuse construction but can be a switch blade as well, and it is to be noted that the members 132 and 133 of the switch blade in reality constitute terminals of such bridging member.

It is also clear that although the switch has been shown as an open type of cut-out, it obviously could be housed if so desired.

It will be seen that novel forms of cut-out constructions have been provided in which very simple types of contact constructions are employed which have a point contact or line contact engagement between the contacting surfaces, in which a high contact pressure is provided, and in which the use of flexible jumpers is avoided.

It is to be noted particularly that the constructions provide U-shaped connecting members which are formed of resilient material and whose arms ride upon and grip cam-shaped portions of the stationary contacts between them to thus give a very heavy contact pressure and secure an excellent electrical connection with the stationary contacts, the cam portions of the stationary contacts coacting with the resilient connecting members to urge the resilient connecting members towards rocking motion to thereby secure a heavy contact pressure on the terminal of the cut-out, thus securing excellent electrical connection with the terminal of the cut-out. It is to be noted particularly that the contact between the connecting member and the stationary contact is in a plane approximately at right angles to the plane in which the contact pressure is exerted between the connecting member and the terminal of the cut-out. Therefore, the pressure exerted by the connecting member on the stationary contact does not in any way interfere with the pressure exerted by the connecting member on the terminal of the cut-out, but the construction is such that as the pressure increases on the cam portion of the stationary contact, the pressure on the terminal of the cut-out also increases.

It is to be noted that the several constructions each employ a U-shaped type of connecting member with the arms laterally movable outwardly against the resiliency of the connecting member.

It is to be noted that the U-shaped connecting members are of a very simple type for electrically connecting the terminals of the cut-outs with the stationary terminals, and that these connecting members coact with the other portions of the apparatus to avoid the need of flexible conductors, such as braided jumpers, for instance, and yet insure a positive and adequate electrical connection between the terminal of the cut-outs and the stationary terminals.

Although this invention has been described in considerable detail, it is to be understood that such description is intended as illustrative rather than limiting, as the invention may be variously embodied and is to be interpreted as claimed.

I claim:

1. A cut-out construction comprising stationary terminals, a movable bridging member normally electrically bridging said terminals, at least one of said stationary terminals having cam means and including a resilient conducting member yieldingly bearing against said cam means and against said bridging member and exerting a force longitudinally of said bridging member and laterally of said one stationary terminal.

2. A cut-out construction comprising stationary terminals and a movable bridging member normally electrically bridging said terminals, at least one of said stationary terminals including cam means and a resilient, pivotally movable gripping member gripping said cam means, said movable bridging member having projections engaging said gripping member and rocking said gripping member against the action of said cam means when said bridging member is moved to terminal bridging position.

3. A cut-out construction comprising stationary terminals, a bridging member having a terminal, said bridging member being movable and normally electrically bridging said stationary terminals, at least one of said stationary terminals having a resilient conducting member yieldingly bearing against a side portion of such stationary terminal and yieldingly bearing against a portion of the terminal of said bridging member in a direction approximately longitudinally of said bridging member.

4. A cut-out construction comprising stationary terminals, a bridging member having a terminal, said bridging member normally electrically bridging said stationary terminals, and a resilient conducting member having spaced elements yieldingly gripping a portion of one of said stationary terminals, said conducting member having a portion yieldingly bearing against the terminal of said bridging member.

5. A cut-out construction comprising stationary terminals, a bridging member having a terminal, said bridging member normally electrically bridging said stationary terminals, and a resilient U-shaped connecting member loosely attached to one of said stationary terminals and yieldingly gripping a portion thereof between the arms of said U-shaped connecting member, said connecting member having an outer portion yieldingly bearing against the terminal of said bridging member.

6. A cut-out construction having a first and a second stationary terminal, a bridging member having a terminal, said bridging member being normally electrically connected to the second stationary terminal, said first stationary terminal having a cam portion, and a resilient connecting member having arms yieldingly gripping the cam portion of said first stationary terminal between said arms and urged towards motion through coaction with said cam portion and yieldingly bearing against the terminal of said bridging member.

7. A cut-out construction having a first and a second stationary terminal, a bridging member having a terminal, said bridging member normally electrically connecting said stationary terminals, at least one of said stationary terminals having a double cam portion, and a resilient connecting member having arms yieldingly gripping the double cam portion between said arms and urged towards motion through coaction with said cam portion and yieldingly bearing against the terminal of said bridging member.

8. A cut-out construction comprising a first and a second stationary terminal, a bridging member having a terminal, the terminal of said bridging member being normally electrically connected to said second stationary terminal, said first stationary terminal having a cam portion provided with cam faces on opposite sides, and a movable resilient connector having spaced arms biased towards each other and gripping said cam portion between them with the said arms coacting with said cam faces and urging said connector into engagement with the terminal of said bridging member.

9. A cut-out construction comprising a first and a second stationary terminal, a bridging member having a terminal, the terminal of said bridging member being normally electrically connected to said second stationary terminal, said first stationary terminal having a cam portion provided with cam faces on opposite sides, and a movable resilient connector having spaced arms biased towards each other and gripping said cam portion between them with the said arms coacting with said cam faces and urging said connector into engagement with the terminal of said bridging member, said arms and the terminal of said bridging member having detachably interlocking portions.

10. A cut-out construction comprising a first and a second stationary terminal, a bridging member having a terminal, the terminal of said bridging member being normally electrically connected to said second stationary terminal, said first stationary terminal having a cam portion provided with cam faces on opposite sides, and a resilient U-shaped connector pivoted on said first stationary terminal and having arms located on opposite sides of said cam portion and gripping said cam portion and coacting with said cam portion to urge said connector towards rocking motion and urging said connector into engagement with the terminal of said bridg'ng member.

11. A cut-out construction comprising a first and a second stationary terminal, a bridging member having a terminal, the terminal of said bridging member being normally electrically connected to said second stat'onary terminal, said first stationary terminal having a cam portion provided with cam faces on opposite sides, and a resilient U-shaped connector pivoted on said first stationary terminal and having arms located on opposite sides of said cam portion and gripping said cam portion and coacting with said cam porticn to urge said connector towards rocking motion and urging said connector into engagement with the terminal of said bridging member, said arms and the terminal of said bridging member having detachably interlocking portions.

12. A cut-out construction comprising a first and a second stationary terminal, a bridging member having a terminal, said bridging member normally electrically connecting said stationary terminals, at least one of said stationary terminals having a cam portion provided with cam faces on opposite sides, and a pivotally mounted resilient U-shaped connector having arms located on opposite sides of said cam portion and gripping said cam portion and coacting with said cam portion to urge said connector towards rocking motion and urging said connector into engagement with the terminal of said bridging member, said cam portion having stop means to limit the rocking motion of said connector in one direction.

13. A cut-out construction comprising a first and a second stationary terminal, a bridging member having a terminal, said bridging member normally electrically connecting said stationary terminals, at least one of said stationary terminals having a cam portion provided with cam faces on opposite sides, and a pivotally mounted resilient U-shaped connector having arms located on opposite sides of said cam portion and gripping said cam portion and coacting with said cam portion to urge said connector towards rocking motion and urging said connector into engagement with the terminal of said bridging member, said connector having lateral engagement with said cam portion and bearing against the terminal of said bridging member in a direction longitudinally of said bridging member.

14. A cut-out construction comprising a first and a second stationary terminal, a bridging member having a terminal, said bridging member normally electrically connecting said stationary terminals, at least one of said stationary terminals having a cam portion provided with cam faces on opposite sides, and a pivotally mounted resilient U-shaped connector having arms located on opposite sides of said cam portion and gripping said cam portion and coacting with said cam portion to urge said connector towards rocking motion and urging said connector into engagement with the terminal of said bridging member, said connector having lateral engagement with said cam portion and bearing against the terminal of said bridging member in a direction longitudinally of said bridging member, the arms of said connector having looped portions to increase their resiliency intermediate the pivot point of said connector and the point at which said connector engages the terminal of said bridging member.

15. A cut-out construction comprising a first and a second stationary terminal, a bridging member having a terminal, said bridging member normally electrically connecting said stationary terminals, at least one of said stationary terminals having a cam portion provided with cam faces on opposite sides, and a pivoted resilient U-shaped connector having arms located on opposite sides of said cam portion and gripping said cam portion and coacting with said cam portion to urge said connector towards rocking motion and urging said connector into engagement with the terminal of said bridging member, said connector having lateral engagement with said cam portion and bearing against the terminal of said bridging member in a direction longitudinally of said bridging member, the arms of said connector having looped portions approximately at right angles to the axis of said bridging member to increase their lateral resiliency intermediate the pivot point of said connector and the point at which said connector engages the terminal of said bridging member.

16. A fuse construction comprising a first and a second stationary terminal, a fuse tube having a terminal, a fuse link within said fuse tube electrically connecting the terminal of said fuse tube with said second stationary terminal, said first stationary terminal having a cam portion with cam faces on opposite sides, and a resilient U-shaped connector having spaced arms on opposite sides of said cam portion and gripping said cam portion, the transverse portion of said U-shaped connector being pivoted on said first stationary terminal and the arms of said connector coacting with said cam faces to urge said connector towards rocking motion into engagement with the terminal of said fuse tube.

17. A fuse construction comprising a first and a second stationary terminal, a fuse tube having a terminal, a fuse link within said fuse tube electrically connecting the terminal of said fuse tube with said second stationary terminal, said first stationary terminal having a cam portion with cam faces on opposite sides, and a resilient U-shaped connector having spaced arms on opposite sides of said cam portion and gripping said cam portion, the transverse portion of said U-shaped connector being located outwardly from said first stationary contact, said connector having arms gripping said cam portion between them and being pivoted on said first stationary contact, said arms coacting with said cam faces to urge said connector towards rocking motion into engagement with the terminal of said fuse tube.

18. A drop-out fuse construction comprising an upper and a lower stationary terminal, a fuse tube having an upper terminal, a fuse link within said fuse tube electrically connecting the upper terminal of said fuse tube with said lower stationary terminal, mechanism controlled by said fuse link for normally holding said fuse tube in operative position and releasing said fuse tube for drop-out motion when said fuse link is ruptured, said upper stationary terminal having a cam portion with cam faces on opposite sides, and a resilient U-shaped connector pivotally supported on said upper stationary terminal and having spaced arms tending to approach each other and gripping the cam portion between such arms and coacting with said cam faces to urge said arms towards downward rocking motion, said arms having outer portions normally engaging the upper terminal of said fuse tube and biasing said fuse tube towards downward motion.

19. A drop-out fuse construction comprising an upper and a lower stationary terminal, a fuse tube having an upper terminal, a fuse link within said fuse tube electrically connecting the upper terminal of said fuse tube with said lower stationary terminal, mechanism controlled by said fuse link for normally holding said fuse tube in operative position and releasing said fuse tube for drop-out motion when said fuse link is ruptured, said upper stationary terminal having a cam portion with cam faces on opposite sides, and a resilient U-shaped connector pivotally supported on said upper stationary terminal and having spaced arms tending to approach each other and gripping the cam portion between such arms and coacting with said cam faces to urge said arms towards downward rocking motion, said arms having outer portions normally engaging the upper terminal of said fuse tube and biasing said fuse tube towards downward motion, the said mechanism controlled by said fuse link transmitting a small portion of the downward thrust on said fuse tube to said fuse link.

20. A drop-out fuse construction comprising an upper and a lower stationary terminal, a fuse tube having an upper terminal, a fuse link within said fuse tube electrically connecting the upper terminal of said fuse tube with said lower stationary terminal, lever mechanism pivotally supporting said fuse tube from said lower stationary terminal for drop-out rocking motion, said lever mechanism being controlled by said fuse link and normally holding said fuse tube in operative position and releasing said fuse tube when said fuse link is ruptured, said upper stationary terminal having a cam portion provided with cam faces on opposite sides, and a U-shaped resilient connector pivotally mounted on said upper terminal and having detachably interlocking engagement with the upper terminal of said fuse tube, said cam faces coacting with the arms of said U-shaped resilient connector to urge said connector towards downward rocking motion and biasing said fuse tube downwardly, said lever mechanism being biased towards releasing motion by the downward thrust from said resilient connector.

21. A drop-out fuse construction comprising an upper and a lower stationary terminal, a fuse tube having an upper terminal, a fuse link within said fuse tube electrically connecting the upper terminal of said fuse tube with said lower stationary terminal, a sleeve slidably supporting said fuse tube, mechanism controlled by said fuse link for holding said fuse tube in operative position against downward sliding motion through said sleeve and releasing said fuse tube upon rupture of said fuse link for downward sliding motion, said upper stationary terminal having a cam portion provided with cam faces on opposite sides, and a U-shaped resilient connector pivotally mounted on said upper stationary terminal and having spaced arms tending to move towards each other and gripping said cam portion, said arms coacting with said cam faces to urge said connector towards downward rocking motion into engagement with the upper terminal of said fuse tube and biasing said fuse tube towards downward sliding motion.

22. A cut-out construction comprising a first and a second stationary terminal, a bridging member having a terminal, said bridging member being normally electrically connected to said second stationary terminal, said first stationary terminal having a cam portion with cam faces on opposite sides and a relatively heavy resilient U-shaped connector having spaced arms on opposite sides of said cam portion and gripping said cam portion, said U-shaped connector being pivotally supported from said first stationary terminal and the arms of said connector coacting with said cam faces to urge said connector towards rocking motion into engagement with the terminal of said bridging member, the arms of said connector having a small area high pressure contact with said cam faces and with the terminal of said bridging member and constituting the electrical conducting means between the terminal of said bridging member and the cam portion of said first stationary terminal.

23. A housed type of drop-out fuse comprising a housing, a door for said housing, an upper stationary terminal and a lower stationary terminal, a fuse tube mounted within said housing, a fuse link electrically connecting the upper terminal of said fuse tube with said lower stationary terminal, mechanism controlled by said fuse link for normally holding said fuse tube against drop-out motion and releasing said fuse tube for drop-out motion upon rupture of said fuse link, said upper stationary terminal having a cam portion provided with cam faces on opposite sides thereof, and a U-shaped resilient connector pivotally mounted on said upper stationary terminal and having spaced arms urged towards each other and gripping the cam portion therebetween, said arms coacting with said cam faces to urge said connector downwardly into engagement with the upper terminal of said fuse tube.

24. A housed type of drop-out fuse comprising a housing, a door for said housing, an upper stationary terminal and a lower stationary terminal, a fuse tube mounted within said housing, said fuse tube having an upper terminal, a fuse link electrically connecting the upper terminal of said fuse tube with said lower stationary terminal, mechanism controlled by said fuse link for normally holding said fuse tube against drop-out motion and releasing said fuse tube for drop-out motion upon rupture of said fuse link, said upper stationary terminal having a cam portion provided with cam faces on opposite sides thereof, and a U-shaped resilient connector pivotally mounted on said upper stationary terminal and having spaced arms urged towards each other and gripping the cam portion therebetween, said arms coacting with said cam faces to urge said connector downwardly into engagement with the upper terminal of said fuse tube, said connector biasing said fuse tube towards drop-out motion.

25. A housed type of drop-out fuse comprising a housing, a door for said housing, an upper stationary terminal and a lower stationary terminal, a fuse tube mounted within said housing, said fuse tube having an upper terminal, a fuse link electrically connecting the upper terminal of said fuse tube with said lower stationary terminal, mechanism controlled by said fuse link for normally holding said fuse tube against drop-out motion and releasing said fuse tube for drop-out motion upon rupture of said fuse link, said upper stationary terminal having a cam portion provided with cam faces on opposite sides thereof, and a U-shaped resilient connector pivotally mounted on said upper stationary terminal and having spaced arms urged towards each other and gripping the cam portion therebetween, said arms coacting with said cam faces to urge said connector downwardly into engagement with the upper terminal of said fuse tube, said connector biasing said fuse tube towards drop-out motion and said mechanism transmitting a small portion of the downward thrust on said fuse tube to said fuse link.

26. A housed type of drop-out fuse comprising a housing, a door for said for said housing, an upper stationary terminal and a lower stationary terminal, a fuse tube mounted within said housing, said fuse tube having an upper terminal, a fuse link electrically connecting the upper terminal of said fuse tube with said lower stationary terminal, mechanism controlled by said fuse link for normally holding said fuse tube against drop-out motion and releasing said fuse tube for drop-out motion upon rupture of said fuse link, said upper stationary terminal having a cam portion provided with cam faces on opposite sides thereof, and a U-shaped resilient connector pivotally mounted on said upper stationary terminal and having spaced arms urged towards each other and gripping the cam portion therebetween, said arms coacting with said cam faces to urge said connector downwardly into engagement with the upper terminal of said fuse tube, said connector biasing said fuse tube towards drop-out motion, the transverse portion of said U-shaped connector extending substantially upwardly with respect to the upper end of said fuse tube.

27. A housed type of drop-out fuse comprising a housing, a door for said housing, an upper stationary terminal and a lower stationary terminal, a fuse tube mounted within said housing, said fuse tube having an upper terminal, a fuse link electrically connecting the upper terminal of said fuse tube with said lower stationary terminal, mechanism controlled by said fuse link for normally holding said fuse tube against drop-out motion and releasing said fuse tube for drop-out motion upon rupture of said fuse link, said upper stationary terminal having a cam portion provided with cam faces on opposite sides thereof, and a U-shaped resilient connector pivotally mounted on said upper stationary terminal and having spaced arms urged towards each other and gripping the cam portion therebetween, said arms coacting with said cam faces to urge said connector downwardly into engagement with the upper terminal of said fuse tube, said connector biasing said fuse tube towards drop-out motion, the transverse portion of said U-shaped connector extending substantially laterally across the upper end of said fuse tube.

28. A housed type of drop-out fuse comprising a housing, a door for said housing, an upper stationary terminal and a lower stationary terminal, a sleeve supported within said housing, a fuse tube slidably mounted within said sleeve and adapted to slide through said sleeve outwardly with respect to said housing, said fuse tube having an upper terminal, a fuse link electrically connecting the upper terminal of said fuse tube with said lower stationary terminal, mechanism controlled by said fuse link for normally holding said fuse tube against downward sliding motion and releasing said fuse tube for downward sliding motion upon rupture of said fuse link, said upper stationary terminal having a cam portion provided with cam faces on opposite sides thereof, and a U-shaped resilient connector pivotally mounted on said upper stationary terminal and having spaced arms urged towards each other and gripping the cam portion therebetween, said arms coacting with said cam faces to urge said connector downwardly into engagement with the upper terminal of said fuse tube.

29. A housed type of drop-out fuse comprising a housing, a door for said housing, an upper stationary terminal and a lower stationary terminal, a sleeve supported within said housing, a fuse tube slidably mounted within said sleeve and adapted to slide through said sleeve outwardly with respect to said housing, said fuse tube having an upper terminal, a fuse link electrically connecting the upper terminal of said fuse tube with said lower stationary terminal, mechanism controlled by said fuse link for normally holding said fuse tube against downward sliding motion and releasing said fuse tube for downward sliding motion upon rupture of said fuse link, said upper stationary terminal having a cam portion provided with cam faces on opposite sides thereof, and a U-shaped resilient connector pivotally mounted on said upper stationary terminal and having spaced arms urged towards each other and gripping the cam portion therebetween, said arms coacting with said cam faces to urge said connector downwardly into engagement with the upper terminal of said fuse tube, said connector biasing said fuse tube towards downward sliding motion.

30. A fuse construction comprising a first and a second stationary terminal, a fuse tube having a terminal, a fuse link within said fuse tube electrically connecting the terminal of said fuse tube with said second stationary terminal, said first stationary terminal having a cam portion with cam faces on opposite sides, and a resilient U-shaped connector having spaced arms on opposite sides of said cam portion and gripping said cam portion, the transverse portion of said U-shaped connector being pivoted on said first stationary terminal and the arms of said connector coacting with said cam faces to urge said connector towards rocking motion into engagement with the terminal of said fuse tube, said connector being formed of a single length of resilient rod stock.

31. A fuse construction comprising a first and a second stationary terminal, a fuse tube having a terminal, a fuse link within said fuse tube electrically connecting the terminal of said fuse tube with said second stationary terminal, said first stationary terminal having a cam portion with cam faces on opposite sides, and a resilient U-shaped connector having spaced arms on opposite sides of said cam portion and gripping said cam portion, said U-shaped connector being pivoted on said first stationary terminal and the arms of said connector coacting with said cam faces to urge said connector towards rocking motion into engagement with the terminal of said fuse tube, said connector being formed of flat stock and the arms of said connector having bell crank portions with the portions of said arms coacting with said cam faces at the ends of the arms of said bell crank portions.

32. A cut-out construction comprising a first and a second stationary terminal, a bridging member having a terminal, the terminal of said bridging member being normally electrically connected to said second stationary terminal, said first stationary terminal having a cam portion provided with cam faces on opposite sides, and a resilient U-shaped connector having its transverse portion pivoted on said first stationary portion and having outwardly projecting arms located on opposite sides of said cam portion and gripping said cam portion and coacting with said cam portion to urge said connector towards rocking motion and urging said connector into engagement with the terminal of said bridging member, said arms and the terminal of said bridging member having detachably interlocking portions.

33. A switch construction comprising a first and a second stationary terminal, a switch blade pivotally supported adjacent one end from said second terminal and having a terminal adjacent its other end, and a resilient U-shaped connector pivoted on said first stationary terminal, said first terminal having a cam portion provided with cam faces on opposite sides, said U-shaped connector having arms located on opposite sides of said cam portion and gripping said cam portion and coacting with said cam portion to urge said connector into engagement with the terminal of said switch blade.

34. A cut-out construction comprising a pair of stationary terminals, a bridging member having a pair of spaced terminals, means movably supporting said bridging member, said stationary terminals each having a cam portion provided with cam faces on opposite sides, and a U-shaped resilient connector pivoted on each stationary terminal and having arms located on opposite sides of the cam portion of the corresponding stationary terminal and gripping such cam portion, the arms of said connectors coacting with said cam portions to urge said connectors into engagement with the terminals of said bridging member.

35. A cut-out construction comprising stationary terminals and a movable bridging member normally electrically bridging said terminals, at least one of said stationary terminals including cam means and a resilient, pivotally movable gripping member gripping said cam means, said movable bridging member having projections engaging said gripping member and rocking said gripping member against the action of said cam means when said bridging member is moved to terminal bridging position, said gripping member having latch means for engaging said projections to thereby yieldingly latch said bridging member in terminal bridging position.

36. A drop-out fuse construction comprising an upper and a lower stationary terminal, a fuse tube having an upper terminal, a fuse link within said fuse tube electrically connecting the upper terminal of said fuse tube with said lower stationary terminal, mechanism controlled by said fuse link for normally holding said fuse tube in operative position and releasing said fuse tube for drop-out motion when said fuse link is ruptured, said upper stationary terminal having a cam portion with cam faces on opposite sides, and a resilient U-shaped connector pivotally supported on said upper stationary terminal and having spaced arms tending to approach each other and gripping the cam portion between such arms and coacting with said cam faces to urge said arms towards downward rocking motion, said arms having outer portions normally engaging the upper terminal of said fuse tube and biasing said fuse tube towards downward motion, said arms and said upper terminal of the fuse tube having detachable interlocking latching portions, the said mechanism controlled by said fuse link transmitting a small portion of the downward thrust on said fuse tube to said fuse link.

37. A cut-out construction comprising stationary terminals and a movable bridging member normally electrically bridging said terminals, at least one of said stationary terminals including cam means and a resilient, pivotally movable gripping member gripping said cam means, said movable bridging member having projections engaging said gripping member and rocking said gripping member against the action of said cam means when said bridging member is moved to terminal bridging position, said cam means being so designed with relation to said pivotal movable gripping member as to produce a relatively great lateral pressure between said gripping member and said cam means and a predetermined pressure between said gripping member and said projections, whereby a predetermined longitudinal pressure is exerted longitudinally of said bridging member.

38. A drop-out fuse construction comprising an upper and a lower stationary terminal, a fuse tube having an upper terminal, a fuse link within said fuse tube electrically connecting the upper terminal of said fuse tube with said lower stationary terminal, mechanism controlled by said fuse link for normally holding said fuse tube in operative position and releasing said fuse tube for drop-out motion when said fuse link is ruptured, said upper stationary terminal having a cam portion with cam faces on opposite sides, and a resilient U-shaped connector pivotally supported on said upper stationary terminal and having spaced arms tending to approach each other and gripping the cam portion between such arms and coacting with said cam faces to urge said arms towards downward rocking motion, said arms having outer portions normally engaging the upper terminal of said fuse tube and biasing said fuse tube towards downward motion, said cam portion being so related to the resilient pivotally supported connector as to produce a relatively great lateral pressure between said connector and said cam portion and a predetermined downward thrust on said fuse tube, the said mechanism controlled by said fuse link transmitting a small portion of the downward thrust on said fuse tube to said fuse link.

39. A cut-out construction comprising a first and a second stationary terminal, a bridging member connected to said second stationary terminal and having a pair of conical projecting terminal members, said first stationary terminal having a cam portion provided with cam faces on opposite sides, and a resilient U-shaped connector pivoted on said first stationary terminal and having arms located on opposite sides of said cam portion and gripping said cam portion and coacting with said cam portion to urge said connector towards rocking motion and urging said connector into engagement with the conical projecting terminal members of said bridging member, said resilient connector having conical recessed portions normally receiving the conical projecting terminal members of said bridging member.

40. A fuse construction comprising a support having upper and lower stationary contacts, said upper contact including a stationary portion having oppositely extending divergent cam portions and a U-shaped spring contact having arms embracing said cam portions and tending to move downwardly on said cam portions, a fuse tube normally positioned between said contacts and having portions on opposite sides engaging under said spring arms and forcing said spring arms upwardly on said cam surfaces when said fuse tube is in operative position, and a fuse link within said fuse tube normally connecting said stationary contacts.

41. A fuse construction comprising a support having upper and lower stationary contacts, said upper contact including a stationary portion having oppositely extending divergent cam portions and a U-shaped spring contact having arms embracing said cam portions and tending to move downwardly on said cam portions, said upper contact including means for loosely pivotally holding said U-shaped spring contact, a fuse tube normally positioned between said contacts and having portions on opposite sides engaging under said spring arms and forcing said spring arms upwardly on said cam surfaces when said fuse tube is in operative position, and a fuse link within said fuse tube normally connecting said stationary contacts.

42. A drop-out fuse construction comprising a support having upper and lower stationary contacts, said contact including a stationary portion having oppositely extending divergent cam portions and a U-shaped spring contact having arms embracing said cam portions and tending to move downwardly on said cam portions, a fuse tube normally positioned between said contacts and having portions on opposite sides engaging under said spring arms and forcing said spring arms upwardly on said cam surfaces when said fuse tube is in operative position, said spring arms having latching engagement with the said portions on opposite sides of said fuse tube, lever means normally supporting said fuse tube in latched position and biased to fuse tube releasing position, and a fuse link within said fuse tube normally restraining said lever means and releasing said lever means when said fuse link is ruptured, said fuse link being tensioned due to the downward component of the force produced by the pressure of the arms of the U-shaped spring contact on said cam portions.

WILLIAM O. SCHULTZ.